A. C. NIELSEN.
CUTTING TOOL HOLDER.
APPLICATION FILED JUNE 10, 1920.
1,371,515.
Patented Mar. 15, 1921.
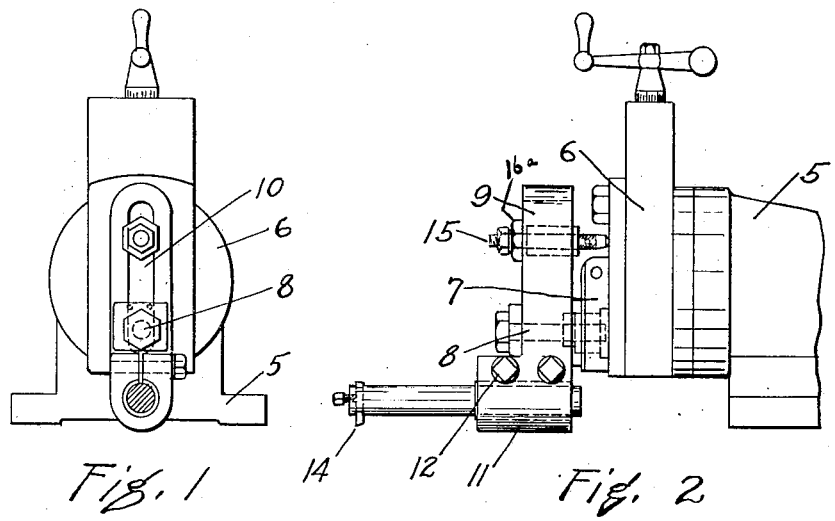
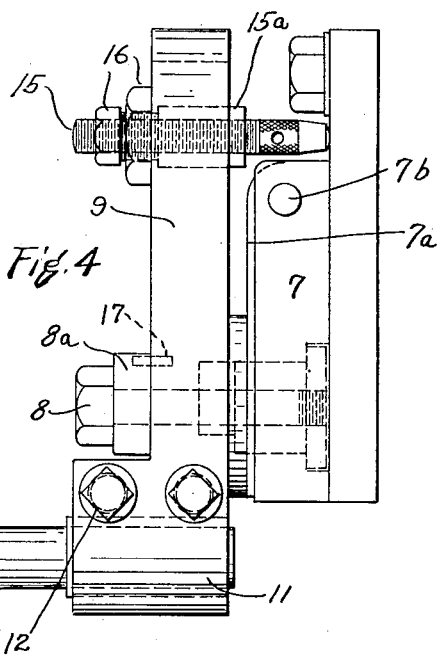
Inventor
A. C. Nielsen
By John A. Bronhardt
Attorney

UNITED STATES PATENT OFFICE.

ANDREW C. NIELSEN, OF CLEVELAND, OHIO.

CUTTING-TOOL HOLDER.

1,371,515.  Specification of Letters Patent.  Patented Mar. 15, 1921.

Application filed June 10, 1920. Serial No. 387,833.

*To all whom it may concern:*

Be it known that I, ANDREW C. NIELSEN, citizen of the United States, residing at Cleveland, in the county of Cuyahoga and State of Ohio, have invented certain new and useful Improvements in Cutting-Tool Holders, of which the following is a specification.

This invention relates to cutting tool holders, particularly slotting and key seating tools for shapers, and has for its object to provide a tool holder having a wide range of adjustment for adapting it to various sizes and makes of machines; also a holder adaptable to take care of different kinds and sizes of tools, and means for quickly and accurately attaching and detaching the tools in the socket provided in the holder. In order to properly accomplish this result particular attention has been given to providing a wide range of adjustment on the tool relative to the relation of the tool holding socket and the tool and the clamping members for holding it in place on the machine apron; also to provide substantial clapper movement controlling means, which also are given full adjustment relative to the positions mentioned before, and in addition this adjustable clapper movement controlling device has been also made so as to be adjustable in respect to the amount of clapper movement desired to be given the tool on different classes of work. With this clapper movement controlling device it is also possible to eliminate clapper movement as is sometimes desirable when working in deep holes with a long tool; also in order to produce a tool simple in construction and strong for meeting the thrust of a heavy cut, the frame like body has been found to meet all the requirements and will be described more fully in detail hereinafter.

In the accompanying drawings Figure 1 is a front elevation of the holder. Fig. 2 is a side elevation. Fig. 3 is a front elevation, enlarged, of the tool holder body, and Fig. 4 is a side elevation of the same and the swivel head.

Referring specifically to the drawings, 5 indicates a ram or slide of the shaping machine which is reciprocated in the usual manner, and has secured to its front end the usual adjusting head 6 carrying the swivel clapper box 7 in which is pivoted at 7$^b$ the apron or clapper 7$^a$ which swings to make the cutting point of the tool clear the work on the back stroke of the tool. This carries a stud 8 by which the tool holder proper is attached to the apron.

The tool holder is indicated at 9 and comprises an elongated body slotted lengthwise as indicated at 10 and provided at its lower end with a clamp 11 for holding the bar 13 of the cutter 14. The two sides of the clamp are divided by a slit 10$^a$ which forms a continuation of the slot 10, and the cutter bar is clamped by two screws 12 extending across said slit, the sides of the body having sufficient spring to permit them to be drawn up by the screws against the cutter bar and having a tendency to spring back to its original position when the screws are backed up again thus freeing automatically the cutter bar so that it may easily be removed and replaced by hand. The clamp socket for receiving the cutter bar may be made of a certain size, and for smaller bars a lining or bushing can be used in the socket. A bearing washer 8$^a$ is engaged under the head of the stud 8 and held by pins 17 bears against the body at opposite sides of the slot 10. 15 is an adjusting screw for regulating the movement of the clapper, and this screw is tapped through a shouldered block 15$^a$ which fits in the slot 10 where it may be adjusted and clamped in any desired position by a clamping nut 16$^a$ on a threaded extension of said block. The clapper movement regulating screw 15 is fixed at adjustment by the lock nut 16 provided thereon. The drawing shows the clapper fixed against movement, but by backing out the screw 15 it can be allowed to swing to any extent desired.

By the means described the holder 9 may be adjusted angularly or vertically, and fixed at adjustment by the stud 8, and the screw 15 is also capable of adjustment both in respect to position in slot 10 as well as in respect to controlling the clapper movement of the tool which may on some work be allowed to be considerable while on other classes of work it may be desirable to arrest the movement entirely, which can, as set forth, be properly taken care of. The holder 9 comprises a continuous piece of great strength and rigidity in the line of the cutting thrust, and as the slot extends nearly the whole length of the holder a wide range of adjustmnt is possible. As stated, the body has sufficient spring to allow the cutter bar to be readiy inserted in or removed from the clamp socket when the screws 12 are released, and to firmly clamp the bar when the screws are tightened.

The device will be found very useful for holding a variety of tools in slotting or shaping operations, with a shaping machine of the kind referred to.

I claim:—

1. A cutting tool holder comprising a slotted body having a socket for a cutter bar at one end of the slot, and a clamping screw connecting opposite sides of the body, across the slot and adapted to spring the same toward each other to clamp the cutter bar in the socket, the sides of the body being spaced apart at the upper end of the slot, to permit a bolt to be inserted between said sides.

2. A cutting tool holder comprising a body member having a longitudinal slot terminating in a socket at one end thereof perpendicular to the long axis of the slot, and a clamping screw connecting opposite sides of the body, across said slot and adapted to spring the sides toward each other, to clamp a cutter bar in the socket, the sides of the body being spaced apart at the upper end of the slot, to permit a bolt to be inserted between said sides.

3. The combination with a shaper apron and its stud, of a tool holder having a slot through which said stud extends, and a clamp for a tool shank, at the lower end of said slot, said slot permitting the sides of the holder to be sprung toward each other.

4. The combination with a shaper apron and its stud, of a cutter bar holder having a slot through which said stud extends, an adjustable clapper controlling device extending through said slot, near one end of the holder, and a cutter bar clamp at the opposite end of the holder.

5. A cutting tool holder comprising an elongated body having a longitudinal slot, said slot being closed at both ends and shaped at one end to form opposite sides of a tool clamp, and cross screws connecting said opposite sides, the sides of the body being spaced apart at the upper end of the slot, to permit a bolt to be inserted between said sides.

6. The combination with a slotted tool holder, and a pivoted apron or clapper to which it is fixed, of a block adjustable in the slot, means to hold the block at adjustment, a screw tapped through the block, and a lock nut on the screw, engaging the block to hold the screw at adjustment.

7. The combination with a slotted tool holder and a pivoted apron or clapper block to which it is fixed, of a screw, a flanged block through which said screw is threaded, a check nut on said screw for locking it at adjustment and a nut on the flanged block for clamping the block at any desired position in the slot in the tool holder.

In testimony whereof I do affix my signature in presence of two witnesses.

ANDREW C. NIELSEN.

Witnesses:
JOHN A. BOMMHARDT,
G. ROSENBERG.